United States Patent [19]

Ewen

[11] 4,398,322
[45] Aug. 16, 1983

[54] HITCH PIN ASSEMBLY

[76] Inventor: Warren E. Ewen, R.R. 1, Jeffers, Minn. 56145

[21] Appl. No.: 239,528

[22] Filed: Mar. 28, 1981

[51] Int. Cl.³ ...................... A44B 17/00; A44B 19/00
[52] U.S. Cl. ................................ 24/201 LP; 24/219; 24/220; 280/504
[58] Field of Search .................... 24/217 R, 219, 220, 24/221 R, 201 LP, 150 R, 155 T; 280/504, 515; 215/332, 222, 223

[56] References Cited

U.S. PATENT DOCUMENTS

| | | | |
|---|---|---|---|
| 549,434 | 11/1895 | Budd . | |
| 593,729 | 11/1897 | Skinner . | |
| 914,133 | 3/1909 | Fulton . | |
| 1,060,675 | 5/1913 | Gilchrist | 24/201 LP |
| 1,801,846 | 4/1931 | Campbell . | |
| 1,812,476 | 6/1931 | Godley . | |
| 1,955,740 | 4/1934 | Dzus | 24/231 |
| 2,054,519 | 9/1936 | Dzus | 24/221 |
| 2,367,874 | 1/1945 | Kelley | 280/33.15 |
| 2,548,326 | 4/1951 | Kellogg et al. | 85/5 |
| 3,011,801 | 12/1961 | Neumann | 280/515 |
| 3,161,264 | 12/1964 | Isaacson | 189/26 |
| 3,393,924 | 7/1968 | Silver | 280/461 |
| 3,559,832 | 2/1971 | Balducci | 215/223 |
| 3,585,824 | 6/1971 | Schenk | 70/168 |
| 4,023,823 | 5/1977 | Saunders | 280/515 |
| 4,087,112 | 5/1978 | Lee, Jr. | 280/515 |
| 4,227,287 | 10/1980 | Gunther | 24/221 K |

Primary Examiner—Robert Peshock
Attorney, Agent, or Firm—Kinney, Lange, Braddock, Westman and Fairbairn

[57] ABSTRACT

A hitch pin assembly for connecting a hitch of a towing vehicle (e.g. an agricultural tractor) with a tongue of a towed vehicle (e.g. an agricultural implement) includes a coupling pin having a pinhead and handle at its upper end. The coupling pin is inserted through the hitch and tongue, and is held in place by a collar, which is connected to the lower end of the coupling pin. The collar and the pin are locked together by a locking mechanism which includes a pair of L shaped channels at the lower end of the coupling pin, a pair of locking pins carried by the collar which cooperate with the channels, and a bias spring carried on the collar. The bias spring provides an axial bias force which holds the locking pins in locking seat portions of the channels during normal use. When the tractor and implement are to be disconnected, an axial force sufficient to overcome the bias spring force is applied to the pin and collar, the pin and collar are rotated approximately a quarter turn with respect to one another, and then separated from one another.

10 Claims, 5 Drawing Figures

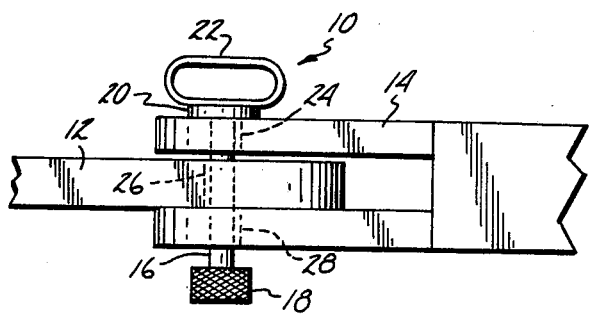
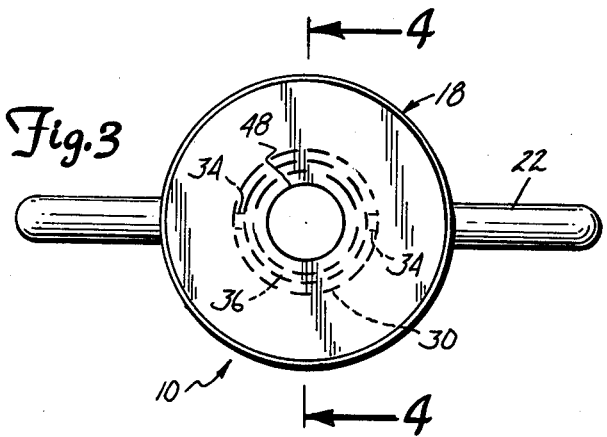
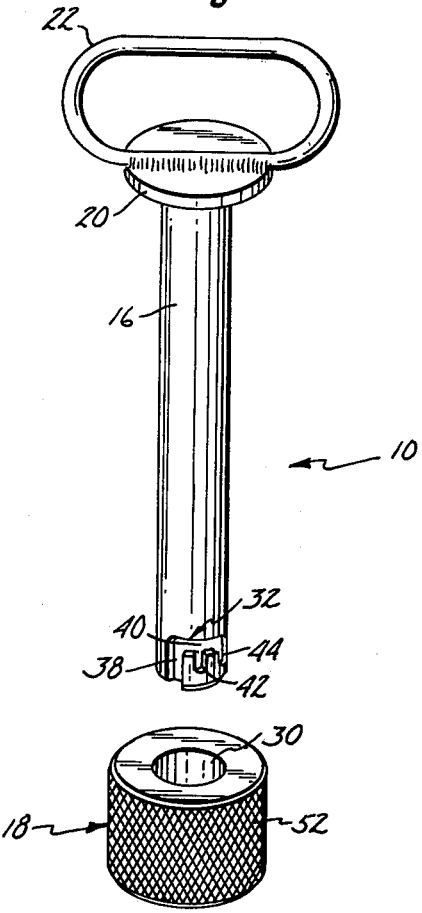
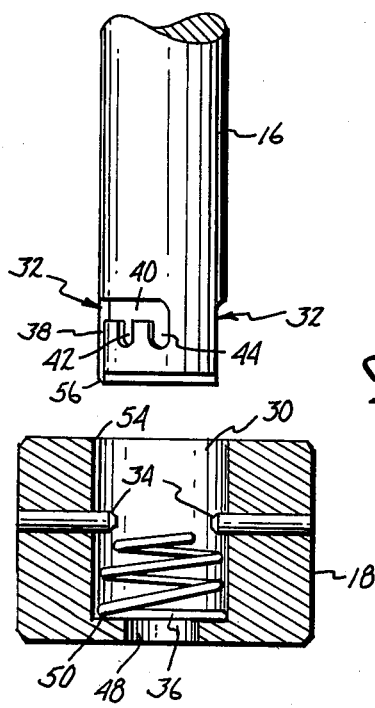
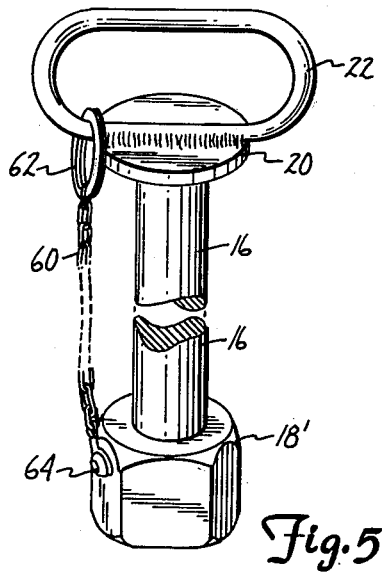

HITCH PIN ASSEMBLY

BACKGROUND OF THE INVENTION

1. Field of the Invention

The present invention relates to a hitch pin assembly for connecting an agricultural tractor with a towed agricultural implement.

2. Description of the Prior Art

Hitch pins are commonly used to couple the hitch of a towing vehicle such as an agricultural tractor with a tongue of a towed vehicle such as an agricultural implement. Various types of hitch pins have been developed which extend through holes in the hitch and the tongue to connect the two vehicles.

In the case of agricultural vehicles, there is a danger of the hitch pin working its way out of the connecting holes and thereby allowing the towed implement to become disconnected from the tractor. If the tractor and the implement become disconnected, not only will time be lost, but damage to the implement and to hydraulic lines connected between the implement and the tractor can occur.

Various types of hitch pins have been developed in the past to protect against accidental disconnection. In many cases, these devices have included complicated mechanisms for locking and unlocking the hitch pin. There is a continuing need for a hitch pin which is simple to use, lightweight, securely locks the tongue and hitch together when in use and yet is easy to disconnect, is sturdy, safe, and reliable, and yet is inexpensive and easy to manufacture.

SUMMARY OF THE INVENTION

The hitch pin assembly of the present invention includes a coupling pin with a pinhead attached at its upper end. The coupling pin is inserted downward through holes in the hitch and tongue which it connects. The coupling pin is held in place by a collar with a cylindrical cavity into which the lower end of the coupling pin is inserted.

The collar and coupling pin are locked together by a locking mechanism which includes a plurality of circumferentially spaced locking pins and a plurality of L shaped channels, together with a bias spring which is carried in the bottom of the cavity by the collar. To lock the coupling pin and collar together, the collar is moved onto the coupling pin so that the locking pins move in the L shaped channels until they reach locking seat portions of the channels. The bias spring applies an axial bias force which holds the locking pins in the locking seat portions, and thus holds the coupling pin and collar locked together. To separate the coupling pin and collar, an axial force is applied to the pin and collar to overcome the bias force and remove the locking pins from the locking seats, and the pin and collar are then rotated and moved axially with respect to one another so that the locking pins are moved along and out of the L shaped channels.

In preferred embodiments, each channel includes a pair of locking seat portions. Thus, even if the bias force is temporarily overcome, the locking pins must escape not only one but two locking seat portions before they can move in the L shaped channels to a position at which the coupling pin and collar can be separated.

BRIEF DESCRIPTION OF THE DRAWINGS

FIG. 1 illustrates the hitch pin assembly of the present invention connecting a hitch of a towing vehicle with a tongue of a towed vehicle.

FIG. 2 is an exploded perspective view showing a preferred embodiment of the hitch pin assembly of the present invention.

FIG. 3 is a bottom plan view of the hitch pin assembly of FIG. 2.

FIG. 4 is a sectional view along section 4—4 of FIG. 3.

FIG. 5 is a perspective view of another preferred embodiment of the present invention.

DETAILED DESCRIPTION OF THE PREFERRED EMBODIMENTS

In FIG. 1, hitch pin assembly 10 of the present invention is shown in operation connecting together tongue 12 of a towed vehicle with hitch 14 of a towing vehicle. As further illustrated in FIGS. 2-4, hitch pin assembly 10 is a two-piece assembly formed by coupling pin 16 and collar 18. Coupling pin 16 has pinhead 20 attached at its upper end, with handle 22 attached to pinhead 20. Coupling pin 16 is inserted downward through hole 24 of hitch 14, hole 26 of tongue 12, and hole 28 of hitch 14 to couple together tongue 12 and hitch 14.

Coupling pin 16 is held in place by collar 18 (which is mounted on the lower end of coupling pin 16) when hitch pin assembly 10 is coupling together tongue 12 and hitch 14. Collar 18 is disconnectable from coupling pin 16 to permit insertion of coupling pin 16 through holes 24, 26, and 28 when tongue 12 and hitch 14 are to be connected; and to permit removal of coupling pin 16 from holes 24, 26 and 28 when tongue 12 and hitch 14 are to be disconnected. Coupling pin 16 and collar 18 are connected together by a locking mechanism illustrated in FIGS. 2-4.

In the preferred embodiment shown in FIGS. 1-4, collar 18 includes cylindrical cavity 30 into which the lower end of coupling pin 16 is inserted. The locking mechanism includes a pair of L shaped channels 32 at the lower end of coupling pin 16; a pair of locking pins 34 carried by collar 18 and extending into cavity 30; and by a spring 36 which is mounted in the lower end of cavity 30. L shaped channels 32 are identical to one another, are positioned on opposite sides of coupling pin 16, and are 180° apart from one another. Each channel 32 includes axial portion 38, circumferential portion 40, and locking seat portions 42 and 44. Axial channel portion 38 extends axially upward from the lower end of coupling pin 16 to a point where it intersects with circumferential channel portion 40. Locking seat portions 42 and 44 communicate with circumferential channel portion 40 and extend axially downward but do not reach the lower end of coupling pin 16.

Locking pins 34 are positioned within cavity 30 to cooperate with channels 32. To connect coupling pin 16 and collar 18 together, the lower end of coupling pin 16 and cavity 30 or collar 18 are brought together (overcoming the bias spring force of spring 36) so that pins 34 move upward in axial portions 38 of channels 32 until they reach circumferential portions 40. At that point, coupling pin 16 and collar 18 are rotated with respect to one another by approximately a quarter turn, so that pins 34 reach the end of circumferential channel 40. At this point, pressure between coupling pin 16 and collar 18 is released so that bias spring 36 causes pins 34 to move into locking seats 44. Pins 34 are held in locking seats 44 by the axial spring bias force supplied by bias spring 36.

In the preferred embodiment illustrated in the Figures, bias spring 36 is preferably a helical compression spring which is carried in the lower end of cavity 30. Pins 34 prevent bias spring 36 from falling out of cavity 30, even if collar 18 is inverted. The upper end of bias spring 36 engages the lower end of coupling pin 16, and supplies an axial bias force which tends to resist removal of pins 34 from either locking seats 44 or locking seats 42.

To disconnect coupling pin 16 and collar 18, a compressive force is applied by grasping handle 22 and collar 18 and moving them toward one another. This compresses bias spring 18 and moves pins 34 out of locking seats 44 and into circumferential channel portions 40. Collar 18 and handle 22 (and therefore pin 16) are then rotated with respect to one another until pins 34 reach axial channel portions 38. The force between handle 22 and collar 18 can then be released, and the bias force supplied by spring 36 separates coupling pin 16 and collar 18, since pins 34 are free to move in axial channel portions 38.

As illustrated in FIGS. 2 and 4, channels 32 each preferably include a pair of locking seat portions 42 and 44. As discussed previously, locking seats 44 are preferably used in locking coupling pin 16 and collar 18 together. Locking seats 42 are provided as an additional safety feature to prevent unwanted disconnecting of coupling pin 16 and collar 18 while in use. Even if collar 18 were bumped and rotated briefly by stalks of corn or other obstacles, pins 34 must not only move out of locking seat 44, but also must move past locking seats 42 before they can reach axial channel portions 38.

As shown in FIGS. 3 and 4, collar 18 preferably includes passage 48, which extends between the bottom surface of collar 18 and the bottom of cavity 30. Passage 48 has a smaller diameter than cavity 30, so that shoulder 50 is formed at the lower end of cavity 30 to support the lower end of bias spring 36. Passage 48 helps prevent dirt or the like from accumulating in the bottom of cavity 30.

Outside surface 52 of collar 18 is preferably knurled to provide a good gripping surface. This is highly desirable due to the axial and rotational movements of collar 18 and pin 16 with respect to one another which are necessary for connecting and disconnecting pin 16 and collar 18.

As best shown in FIG. 4, upper end 54 of cavity 30 is slightly beveled, as is lower edge 56 of pin 16. These beveled edges permit easy alignment and insertion of pin 16 into cavity 30.

In one successful embodiment of the present invention, coupling pin 16 is a solid steel rod having the length of about seven inches and a diameter of about ⅝ inches. Pinhead 20 is a flat steel circular plate having a thickness of about 5/16 inches, a diameter of about two inches, and a hole in its center into which the upper end of coupling pin 16 is inserted. Pinhead 20 and the upper end of coupling pin 16 are connected together by welding.

Handle 22 is formed by a solid steel rod having a diameter of about ⅜ inches which is bent into a closed loop and welded to the top surface of pinhead 20. Handle 22 provides a grip by which the farmer can carry hitch pin assembly 10 when it is not in use. Even more importantly, handle 22 provides a grip which is used when connecting and disconnecting coupling pin 16 and collar 18, since both compressive axial force and rotational force are required between pin 16 and collar 18.

In this embodiment, collar 18 is preferably a steel cylinder having an outside diameter of about two inches and a height of about 1⅜ inches. In this embodiment, the inner diameter of cavity 30 is slightly larger than the diameter of coupling pin 16, and the depth of cavity 30 is about 1¼ inches. Pins 34 are steel pins having a diameter of about 3/16 inches which extend into the cavity about ⅛ inches. The inner diameter of passage 48 is about ½ inches.

FIG. 5 shows another preferred embodiment of the hitch pin assembly of the present invention. The embodiment shown in FIG. 5 is generally similar to the embodiment shown in FIGS. 1–4, and similar reference numerals are used to designate similar elements.

In the hitch pin assembly of FIG. 5, collar 18' is a hexagonal cylinder, with six flat outer surfaces. The hexagonal shape of collar 18' provides a good gripping surface for connecting and disconnecting collar 18' and coupling pin 16. The locking mechanism for collar 18' and coupling pin 16 is similar to the locking mechanism shown in FIGS. 2–4.

The hitch pin assembly of FIG. 5 also includes chain 60, which extends between handle 22 and collar 18'. Chain 60 is connected to handle 22 by ring 62, and is connected to one of the flat sides of collar 18' by screw 64. Chain 60 holds collar 18' even when collar 18' is disconnected from pin 16, so that collar 18' does not become separated and lost from the rest of hitch pin assembly 10.

In conclusion, hitch pin assembly 10 of the present invention is simple to use, is relatively lightweight, and securely locks tongue 12 and hitch 14 together when they are in use. The quarter turn locking mechanism of hitch pin assembly 10 is easy to connect and disconnect, and is safe and reliable in use. Hitch pin assembly 10 is simple in construction, and therefore is relatively inexpensive and easy to manufacture.

Although the present invention has been described with reference to preferred embodiments, workers skilled in the art will recognize that changes may be made in form and detail without departing from the spirit and scope of the invention.

What is claimed is:

1. A hitch pin assembly for coupling a tongue of a towed vehicle with a hitch of a towing vehicle, wherein the tongue and hitch have vertical holes therethrough which are vertically aligned when the tongue and hitch are coupled, the hitch pin assembly comprising:

a coupling pin having a circular cross-section which is smaller in diameter than the vertically aligned holes for insertion downwardly through the vertically aligned holes and has a length such that an upper end of the pin is positioned above the holes and a lower end of the pin extends below the holes;

handle means attached to the upper end of the coupling pin and having a dimension which is greater than an uppermost of the holes to limit downward movement of the coupling pin in the holes;

collar means for mounting on the lower end of the coupling pin after the coupling pin is inserted downwardly through the vertically aligned holes, the collar means having a dimension which is greater than a lowermost of the holes to limit upward movement of the coupling pin in the holes;

a plurality of circumferentially spaced locking pins on an inner surface of the collar means;

a plurality of circumferentially spaced channels in the lower end of the coupling pin, each channel having an axial portion, a circumferential portion communicating with the axial portion, and a first locking seat portion communicating with the circumferential portion; and bias spring means carried in the collar means for applying an axial bias force to maintain the pins in the respective locking seat portions.

2. The hitch pin assembly of claim 1 wherein each channel further comprises a second locking seat portion communicating with the circumferential portion at a position between the axial portion and the first locking seat portion.

3. The hitch pin assembly of claim 1 wherein the collar means has a circular cylindrical cavity for receiving the lower end of the coupling pin, and wherein the locking pins extend inward into the cavity.

4. The hitch pin assembly of claim 3 and further comprising a passageway communicating with the cavity.

5. The hitch pin assembly of claim 3 wherein the bias spring means is positioned in a bottom of the cavity for engaging the lower end of the coupling pin and applying the axial bias force between the bottom of the cavity and the lower end of the coupling pin.

6. The hitch pin assembly of claim 5 wherein the bias spring means is a helical compression spring.

7. The hitch pin assembly of claim 5 or 6 wherein the locking pins are positioned between the bias spring means and an upper end of the cavity.

8. The hitch pin assembly of claim 1 and further comprising:

chain means connected between the handle means and the collar means.

9. The hitch pin assembly of claim 1 wherein the handle means comprises:

a pinhead attached to the upper end of the coupling pin; and a handle attached to the pinhead.

10. A hitch pin assembly for coupling a tongue of a towed vehicle with a hitch of a towing vehicle, wherein the tongue and hitch have vertical holes therethrough which are vertically aligned when the tongue and hitch are coupled, the hitch pin assembly comprising:

a coupling pin member having a circular cross-section which is smaller in diameter than the vertically aligned holes for insertion downwardly through the vertically aligned holes and having a length such that an upper end of the pin is positioned above the holes and a lower end of the pin extends below the holes;

handle means attached to an upper end of the coupling pin members and having a dimension which is greater than an uppermost of the holes to limit downward movement of the coupling pin in the holes;

a collar member for mounting on a lower end of the coupling pin member, the collar member having a cylindrical cavity for receiving the lower end of the coupling pin member after the coupling pin is inserted downwardly through the vertically aligned holes, the collar means having a dimension which is greater than a lowermost of the holes to limit upward movement of the coupling pin in the holes; and a locking mechanism for locking the collar member and the coupling pin member together, the locking mechanism comprising:

a plurality of circumferentially spaced locking pins carried by one of the members;

a plurality of circumferentially spaced channels carried by the other of the members for engagement with the locking pins, each channel having an axial portion, a circumferential portion communicating with he axial portion, and a first locking seat portion communicating with the circumferential portion; and bias spring means positioned in the cavity for applying an axial bias force between the collar member and the lower end of the coupling pin member when the lower end of the coupling pinmember is in the cavity, the axial bias force being in a direction which resists removal of the pins from the first locking seat portions.

* * * * *